(12) United States Patent
Vinson

(10) Patent No.: US 11,940,011 B2
(45) Date of Patent: Mar. 26, 2024

(54) COUPLING MEMBER, PUMP-PRIMING DEVICE, AND METHOD OF PRIMING AN INTERNAL COMBUSTION ENGINE

(71) Applicant: TCM Engine Products, LLC, Valencia, PA (US)

(72) Inventor: Mark Vinson, Valencia, PA (US)

(73) Assignee: TCM Engine Products, LLC, Valencia, PA (US)

( * ) Notice: Subject to any disclaimer, the term of this patent is extended or adjusted under 35 U.S.C. 154(b) by 814 days.

(21) Appl. No.: 16/851,192

(22) Filed: Apr. 17, 2020

(65) Prior Publication Data

US 2020/0332837 A1 Oct. 22, 2020

Related U.S. Application Data

(60) Provisional application No. 62/835,185, filed on Apr. 17, 2019.

(51) Int. Cl.
| | |
|---|---|
| *F16D 1/06* | (2006.01) |
| *B25B 13/48* | (2006.01) |
| *F16D 1/10* | (2006.01) |
| *F16D 1/116* | (2006.01) |

(52) U.S. Cl.
CPC .............. *F16D 1/116* (2013.01); *B25B 13/48* (2013.01); *F16D 1/06* (2013.01); *F16D 1/101* (2013.01)

(58) Field of Classification Search
CPC . F16D 1/101; F16D 1/116; F16D 1/06; F01M 7/06
See application file for complete search history.

(56) References Cited

U.S. PATENT DOCUMENTS

| | | | | |
|---|---|---|---|---|
| 4,822,322 | A * | 4/1989 | Martin | F16H 7/129 |
| | | | | 474/135 |
| 2012/0255509 | A1* | 10/2012 | Lichti | F01L 1/3442 |
| | | | | 123/90.15 |
| 2014/0056732 | A1* | 2/2014 | Wang | F04C 14/00 |
| | | | | 417/319 |
| 2016/0025091 | A1* | 1/2016 | Schumann | F04C 14/26 |
| | | | | 417/364 |
| 2016/0258507 | A1* | 9/2016 | Onigata | F01M 1/02 |
| 2017/0198755 | A1* | 7/2017 | Brown | F16D 3/10 |
| 2018/0135471 | A1* | 5/2018 | Kajita | F01L 1/3442 |
| 2019/0036431 | A1* | 1/2019 | Zhang | B60K 17/145 |

OTHER PUBLICATIONS www.proformparts.com, "Chevy Oil Pump Primer with Bushing", accessed Apr. 1, 2020.
Melling Engine Auto Parts, "New Oil Pump Pre-Lube Tank", Mar. 2017.

\* cited by examiner

*Primary Examiner* — Long T Tran
(74) *Attorney, Agent, or Firm* — The Webb Law Firm

(57) ABSTRACT

A coupling member for use in priming a fluid pump of an internal combustion engine, the coupling member including a first end, a second end, and a cylindrical length therebetween. The first end of the coupling member may be configured to axially engage a drive shaft of a rotational drive, a plurality of fins may extend along at least a portion of the cylindrical length, and the plurality of fins may be configured to engage an oil drive gear of an internal combustion engine. Each fin from the plurality of fins may protrude radially from an outer surface of the coupling member, and the coupling member may be further configured to translate a rotational force provided by the rotational drive to the oil drive gear of the internal combustion engine.

17 Claims, 8 Drawing Sheets

COUPLING MEMBER, PUMP-PRIMING DEVICE, AND METHOD OF PRIMING AN INTERNAL COMBUSTION ENGINE

CROSS-REFERENCE TO RELATED APPLICATIONS

The present application claims priority to U.S. Provisional Patent Application No. 62/835,185, filed Apr. 17, 2019, the disclosure of which is incorporated herein in its entirety.

BACKGROUND OF THE INVENTION

The present disclosure relates to fluid pump systems for internal combustion engines and, more particularly, to a pump-priming device for an internal combustion engine having a fluid pump with at least one of a suction side and a pressure side.

In newly-built, rebuilt, and/or long-dormant internal combustion engines, it is important to prime the fluid pump and/or the engine with oil prior to initial start-up, as a "dry" start (i.e., engine start-up without oil priming) may lead to component wear and possible failure due to excessive friction and heat caused by a lack of lubrication.

Conventionally, several methods have been used to prime fluid pumps and engines prior to first use. One method utilizes a pressurized oil tank system configured to couple to the engine via fixtures at or near an oil filter, thereby priming by way of the external, pressurized oil tank. However, such methods are often untidy, and the required pressurized oil tank system is be quite costly. In other methods usable only on certain engine types (e.g., Chevrolet V6 and V8 engines), a coupling tool connectable to a hand-held drill has been developed, wherein the coupling tool is configured to fit through a distributor hole in order to prime the engine's fluid pump. However, as noted above, such a coupling tool and priming method is only usable with a limited subset of engine types.

SUMMARY

In view of the foregoing, there exists a need for an economical pump-priming device (and method for use thereof) for use with additional types of internal combustion engines. Embodiments of the present disclosure are generally directed to a coupling member, a pump-priming device for use with an internal combustion engine, and a method for priming a fluid pump of an internal combustion engine.

Embodiments of the present disclosure are directed to a coupling member for use in priming the fluid pump of an internal combustion engine. The coupling member includes a first end, a second end, and a cylindrical length therebetween. The first end of the coupling member may be configured to axially engage a drive shaft of a rotational drive. A plurality of fins may extend along at least a portion of the cylindrical length, the plurality of fins configured to engage an oil drive gear of an internal combustion engine. Each fin from the plurality of fins may protrude radially from an outer surface of the coupling member. The coupling member may be further configured to translate a rotational force provided by the rotational drive to the oil drive gear of the internal combustion engine.

In some embodiments, the first end may include a port configured to receive the drive shaft, thereby axially engaging the coupling member and the drive shaft.

In some embodiments, the port may be configured to receive a ⅜ inch square drive.

In some embodiments, each fin from the plurality of fins may be arranged at a distance greater than or equal to 0.50 inches and less than or equal to 0.75 inches.

In some embodiments, a first outer diameter of the coupling member may be greater than or equal to 1.600 inches and less than or equal to 2.300 inches.

In some embodiments, the plurality of fins may be arranged to include a second outer diameter greater than or equal to 1.700 inches and less than or equal to 2.400 inches.

In some embodiments, the internal combustion engine may be a General Motors LS engine.

In some embodiments, the internal combustion engine may be a Chrysler Hemi engine.

In some embodiments, the plurality of fins may include six fins.

In some embodiments, the plurality of fins may include three fins.

In some embodiments, an axial engagement between the first end of the coupling member and the drive shaft may be permanent.

In some embodiments, the rotational drive may include a handheld electric drill, a hand driven ratchet, a pneumatically driven ratchet, or any combination thereof.

Embodiments of the present disclosure are further directed to a pump priming device for an internal combustion engine with a fluid pump having at least one of a suction side and a pressure side. The pump priming device may include a coupling member having a first end, a second end, and a cylindrical length therebetween. The coupling member may also include a plurality of fins extending along at least a portion of the cylindrical length, wherein each fin from the plurality of fins may protrude radially from an outer surface of the coupling member. The pump priming device may also include a rotational drive, and a drive shaft mounted to the rotational drive. The coupling member and the drive shaft may be further configured to translate the rotational force provided by the rotational drive to an oil drive gear of the internal combustion engine, such that at least one of the suction side and pressure side of the fluid pump are primed.

In some embodiments, the rotational drive may be a handheld electric drill.

In some embodiments, the drive shaft may be a ⅜ inch square drive.

In some embodiments, the plurality of fins may be configured to engage the oil drive gear of the internal combustion engine.

Embodiments of the present disclosure are further directed to a method for priming a fluid pump of an internal combustion engine having at least one of a suction side and a pressure side. The method may include providing a coupling member, wherein the coupling member may include a first end, a second end, a cylindrical length therebetween, and a plurality of fins extending along at least a portion of the cylindrical length, wherein each fin from the plurality of fins may protrude radially from an outer surface of the coupling member. The method may further include inserting a fluid into the fluid pump of the internal combustion engine, and engaging the coupling member and a drive shaft of a rotational drive such that a rotational force provided by the rotational drive can be translated to the coupling member. The method may further include aligning each fin from the plurality of fins with a corresponding geometrical portion of an oil drive gear of the internal combustion engine, and inserting each fin from the plurality of fins into the corresponding geometrical portion of the oil drive gear such that each fin from the plurality of fins is capable of translating the rotational force applied to the coupling member to the oil drive gear. The method may further include generating the rotational force using the rotational drive and translating the rotational force through the coupling member and into the oil drive gear of the internal combustion engine, forcing the fluid inserted into the fluid pump into at least one of the suction side and the pressure side of the fluid pump.

Further details and advantages of the present disclosure will be understood from the following detailed description read in conjunction with the accompanying drawings.

DESCRIPTION OF THE INVENTION

Figure 1:
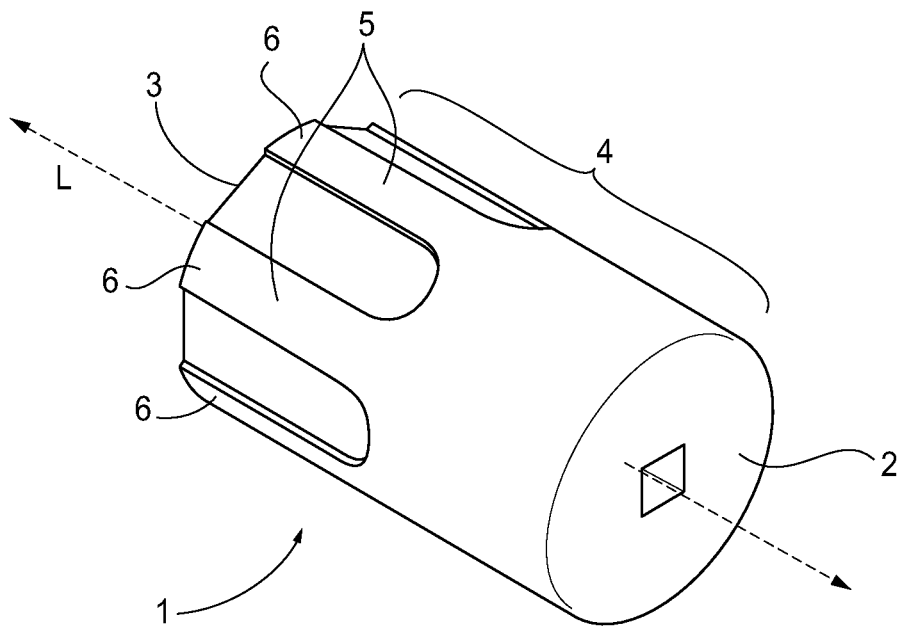
FIG. 1 is a perspective view of a coupling member to engage with an oil drive gear of an internal combustion engine and a drive shaft of a rotational drive, according to an aspect of the present disclosure.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIGS. 1-4, a coupling member 1 includes a first end 2, a second end 3, and a cylindrical length 4. The first end 2 of the coupling member 1 is configured to axially engage a drive shaft of a rotational drive.

The cylindrical length 4 extends along a longitudinal axis L of the coupling member. Although the term "cylindrical" is used to describe the general shape of the coupling member 1, the present disclosure is not limited to a strictly cylindrical form. For example, the coupling member 1 depicted in FIGS. 1-4 may be generally described as cylindrical, but includes geometric features that do not conform to the plain and ordinary meaning of the term. Other shapes and forms of the coupling member 1 are contemplated by the present disclosure, including a rectangular, triangular, hexagonal, octagonal, and any other geometric shape that provides a sufficient outer surface to structurally support the plurality of fins 5, sufficiently engage the oil drive gear of an internal combustion engine, and effectively translate a rotational force from the rotational drive.

In one non-limiting embodiment of the present disclosure, the plurality of fins 5 extends from the second end 3 of the coupling member 1 along at least a portion of the cylindrical length 4 in the longitudinal axis L, as depicted in FIG. 1. However, other configurations are contemplated by the present disclosure, wherein the plurality of fins 5 are alternately positioned. For example, in another non-limiting embodiment of the present disclosure, the plurality of fins 5 may not be located on the second end 3 of the coupling member 1, but might be located exactly in the center of the coupling member 1. In another non-limiting embodiment, the plurality of fins 5 may be located at the first end 2 of the coupling member 1. Each fin 6 from the plurality of fins 5 is configured to engage a geometrical portion of an oil drive gear of an internal combustion engine. Although the non-limiting embodiment of the present disclosure of FIGS. 1-4 depicts six fins 6, other non-limiting embodiments may have more or less depending on the desired application and outcome. For example, the plurality of fins 5 may be specifically configured to engage with a particular oil drive gear having three corresponding geometric portions. Furthermore, the number and nature of the fins may be configured to optimize the performance of the device. For example, the user may desire a reduced amount of rotational force to be translated into the oil drive gear, and therefore configure the coupling member 1 with only two fins 6.

Figure 2:
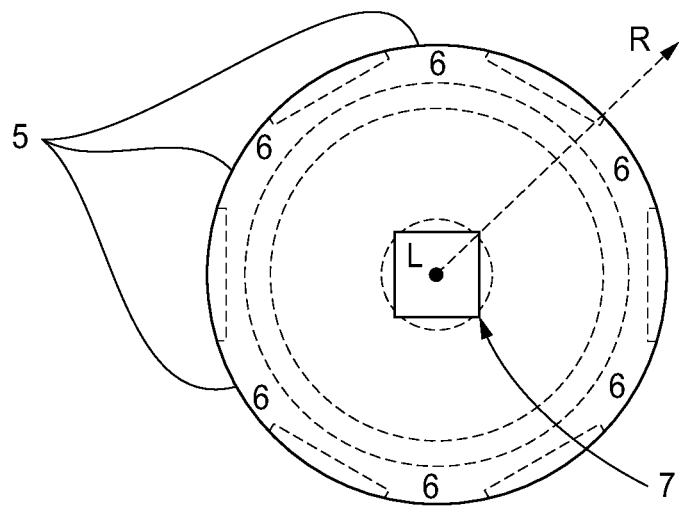
FIG. 2 is a view of a first end of the coupling member shown in FIG. 1.

Referring now to FIG. 2, each fin 6 from the plurality of fins 5 is depicted as protruding outward from the surface of the coupling member in a radial direction R. Radial direction R extends through a center point located on a longitudinal axis L of the coupling member 1. Although the term "radial" is used to generally describe a direction that extends outwards from a center point located on a longitudinal axis L of the coupling member 1, the present disclosure is not limited to a strictly circular cross-section. For example, the coupling member 1 depicted in FIGS. 2 and 3 may be generally described as having a circular cross-section, but includes geometric features that do not conform to the plain and ordinary meaning of the term. Other cross-sections of the coupling member 1 are contemplated by the present disclosure, including a rectangular, triangular, hexagonal, octagonal, and any other geometric shape that provides a sufficient outer surface to structurally support the plurality of fins 5, sufficiently engage the oil drive gear of an internal combustion engine, and effectively translate a rotational force from the rotational drive. In these embodiments, radial direction R still extends outward from a center point located on a longitudinal axis L of the coupling member 1.

As shown in the non-limiting embodiment depicted in FIG. 2, the coupling member 1 is configured to engage a drive shaft of a rotational drive via port 7. Port 7 may be mechanically configured to receive drives of varying shapes and sizes. For example, in one non-limiting embodiment, the port 7 may be configured to receive a ⅜ inch square drive. However, alternate configurations are contemplated by the present disclosure, including ports 7 configured to receive drives that are dimensionally configured in metric units. In other non-limiting embodiments contemplated by the present disclosure, the engagement between the first end 2 of the coupling member 1 and drive shaft is more permanent. For example, the coupling member 1 and drive shaft may be machined out of the same block of material, such that they constitute one solid piece. In other non-limiting embodiments, the coupling member 1 and drive shaft may be separately manufactured, but chemically adhered. For example, the two might be welded together.

Figure 3:
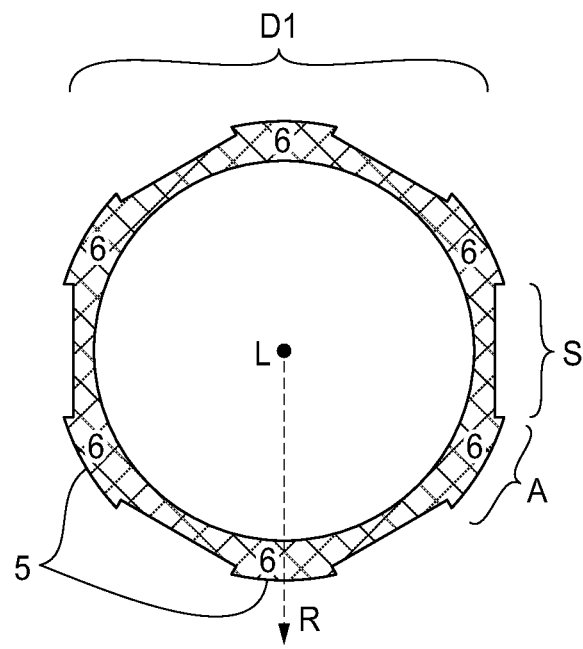
FIG. 3 is a view of a second end of the coupling member shown in FIG. 1.

Referring now to FIG. 3, a non-limiting embodiment of a coupling member 1 according to the present disclosure is depicted as having a distance S between each fin 6 from the plurality of fins 5. Furthermore, each fin 6 from the plurality of fins 5 is depicted as having an arc length A. Although the term "arc length" is used to describe the general shape of the dimension, the present disclosure is not limited to a strictly circular form. For example, the coupling member 1 depicted in FIGS. 2 and 3 may be generally described as having a circular cross-section, but includes geometric features that do not conform to the plain and ordinary meaning of the term. Other cross-sections of the coupling member 1 are contemplated by the present disclosure, including fins 6 of a rectangular, triangular, hexagonal, octagonal, and any other geometric shape that provides a sufficient outer surface to sufficiently engage the oil drive gear of an internal combustion engine, and effectively translate a rotational force from the rotational drive. In these alternate embodiments, arc length A is to be interpreted as a general width of each fin 6.

Furthermore, FIG. 3 depicts an outer diameter D of the cylindrical length 4. Although the term "diameter" is used to describe the general shape of the dimension, the present disclosure is not limited to a strictly circular cross-section. For example, the coupling member 1 depicted in FIGS. 2 and 3 may be generally described as having a circular cross-section, but includes geometric features that do not conform to the plain and ordinary meaning of the term. Other cross-sections of the coupling member 1 are contemplated by the present disclosure, including fins 6 of a rectangular, triangular, hexagonal, octagonal, and any other geometric shape that provides a sufficient outer surface to sufficiently engage the oil drive gear of an internal combustion engine, and effectively translate a rotational force from the rotational drive. In the non-limiting embodiments depicted, a first outer diameter D1 is defined as a length of the cross section that traverses through a center point located on the longitudinal axis L of the coupling member 1, defining the distance between opposing outer surfaces of the coupling member 1. The outer surface is defined as the surface from which each fin 6 from the plurality of fins 5 protrudes.

Distance S and arc length A can be specifically configured to accommodate oil drive gears of varying shapes, sizes, and torsional requirements. For example, distance S might be configured to one dimension for optimal engagement of the oil drive gear of a General Motors LS small block engine. However, distance S might be altered to optimally engage the oil drive gear of a Chrysler Pentastar engine. Distance S may additionally vary depending on the number of fins 6 included in the plurality of fins 5. In a preferred, albeit non-limiting, embodiment of the present invention, distance S is 0.600 inches and first outer diameter D1 is 1.9 inches.

Figure 4:
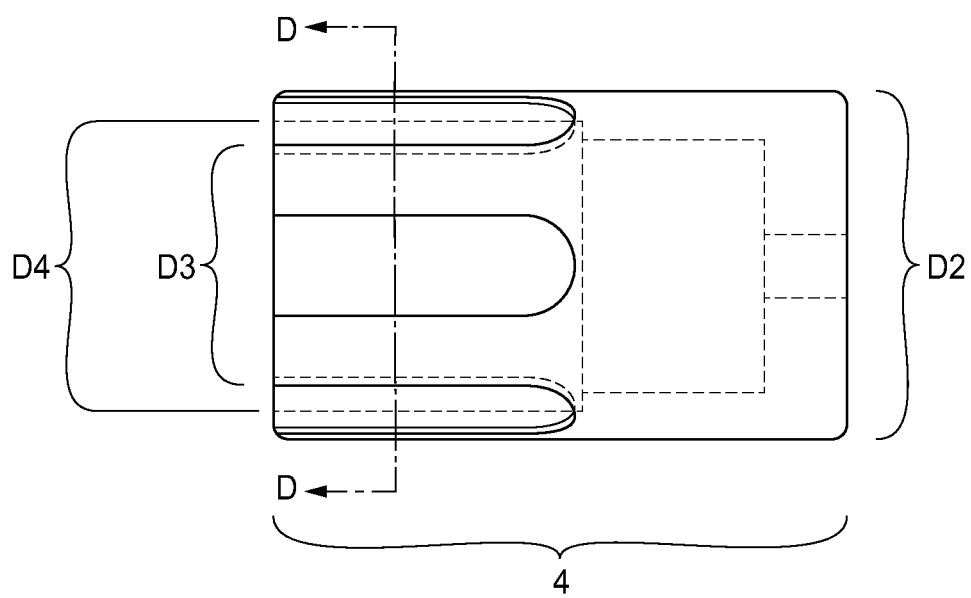
FIG. 4 is a side view of the coupling member shown in FIG. 1.

Referring now to FIG. 4, a non-limiting embodiment of the present disclosure is shown, depicting a side view and varying diameters of coupling member 1. In the non-limiting embodiments depicted, a second outer diameter D2 is defined as a length of the cross section that traverses through a center point located on the longitudinal axis L of the coupling member 1, defining the distance between opposing outer surfaces of each fin 6 from the plurality of fins 5. The outer surface of each fin 6 from the plurality of fins 5 is defined as the top surface of each fin 6 from the plurality of fins 5 that protrude. The second outer diameter D2 is always greater than the first outer diameter D1, and the difference between second outer diameter D2 and first outer diameter D1 defines a height of each fin 6 from the plurality of fins 5. In a preferred, albeit non-limiting, embodiment of the present invention, second outer diameter D2 is 2.080 inches. FIG. 4 further defines an inner diameter D3 of the cylindrical length 4 and an intermediary diameter D4 of the cylindrical length 4, both of which can be modified independent of the other dimensions to provide a preferred amount of structural support for the coupling member 1. For example, both inner diameter D3 and intermediary diameter D4 may be increased to enhance the amount of torsional stiffness of the coupling member 1.

Figure 5:
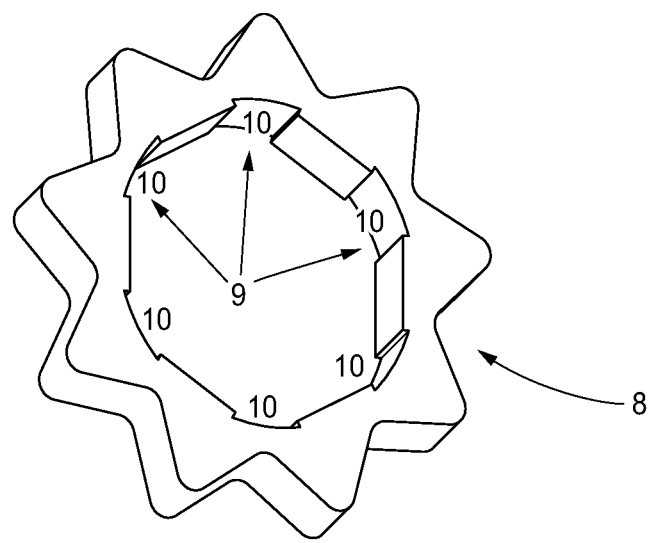
FIG. 5 depicts a non-limiting example of an oil drive gear of an internal combustion engine in accordance with an aspect of the present disclosure.
Figure 6:
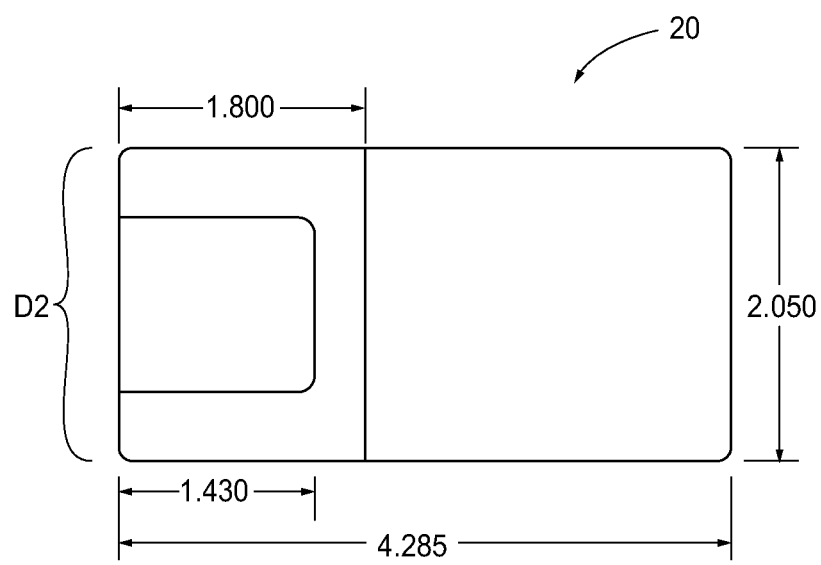
FIG. 6 depicts a side view of a coupling member in accordance with an alternate non-limiting embodiment of the present disclosure.
Figure 7:
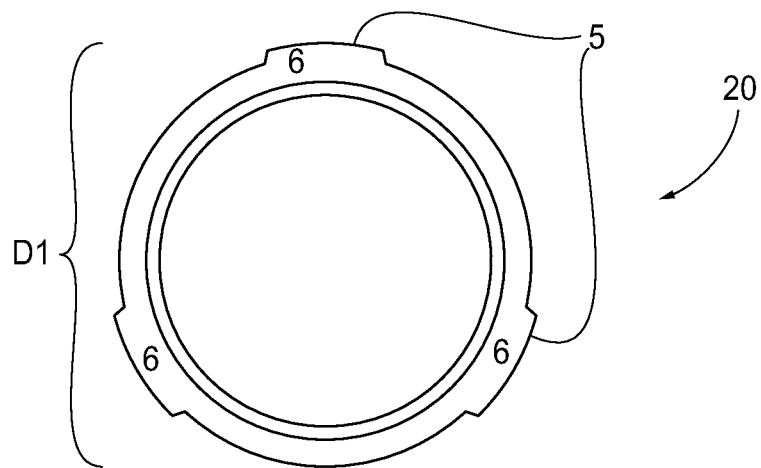
FIG. 7 depicts a view of a second end of the coupling member in accordance with the alternate non-limiting embodiment of the present disclosure.
Figure 8:
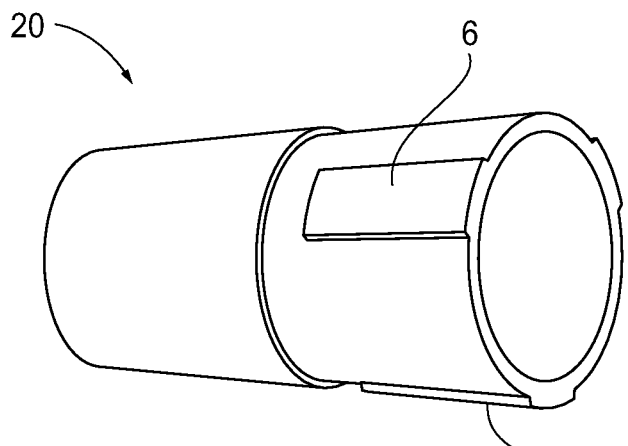
FIGS. 8-11 depict various perspective views of the coupling member in accordance with the alternate non-limiting embodiment of the present disclosure.
Figure 9:
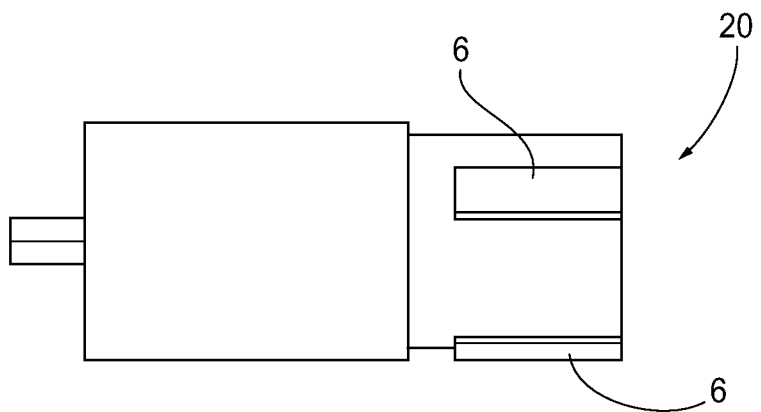
Figure 10:
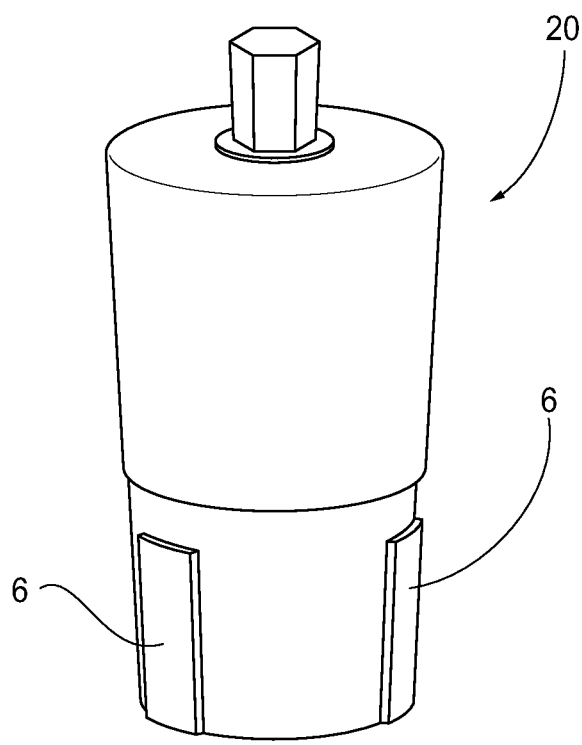
Figure 11:
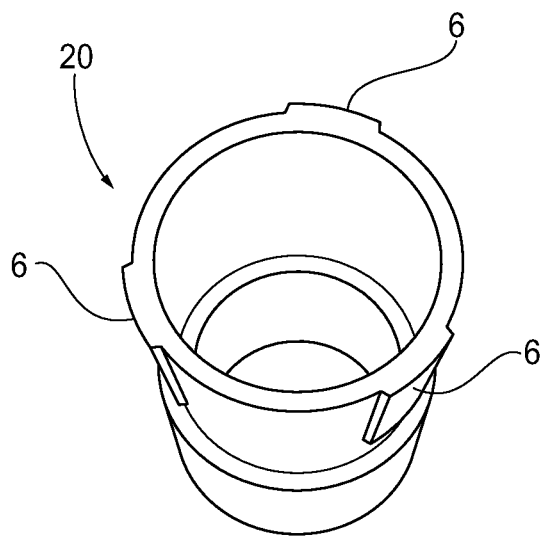

FIG. 5 depicts an oil drive gear 8 of an internal combustion engine. A non-limiting embodiment of the present disclosure is configured to engage the oil drive gear 8 depicted in FIG. 5. The oil drive gear 8 is depicted as having a plurality of geometrical portions 9. Each fin 6 of the plurality of fins 5 arranged on coupling member 1 is configured to engage with each geometric portion 10 from the plurality of geometric portions 9, such that when the rotational drive generates a rotational force, the rotational force is translated through the coupling member 1 into the oil drive gear 8.

A user might insert a fluid such as oil into the fluid pump of an internal combustion engine. Instead of dry-starting the internal combustion engine, the user might first engage the coupling member 1 and the drive shaft of a rotational drive. The user might then align each fin 6 from the plurality of fins 5 with each geometric portion 10 of the plurality of geometric portions 9, thereby inserting the coupling member 1 into the oil drive gear 8 of the internal combustion engine. Finally, the user might generate a rotational force using the rotational drive, thereby translating the rotational force through the drive shaft and coupling member 1, into the oil drive gear 8 of the internal combustion engine. The oil drive gear 8 thus turns independent of the engine itself, forcing the inserted fluid into the suction side and pressure side of a fluid pump of the internal combustion engine. These features are discussed below in connection with FIGS. 13 and 14.

Referring now to FIGS. 6-11, another non-limiting embodiment of the present disclosure is shown. In FIGS. 6-11, the number of fins 6 of the plurality of fins 5 of a coupling member 20 has been reduced to three, and the first outer diameter D1 and second outer diameter D2 have been attenuated to engage an alternately configured oil drive gear 8. The non-limiting embodiment might be optimal for engagement of the oil drive gear 8 of a Chrysler Hemi engine. FIGS. 8-11 depict varying views of a prototype of this alternate, non-limiting embodiment.

Figure 12:
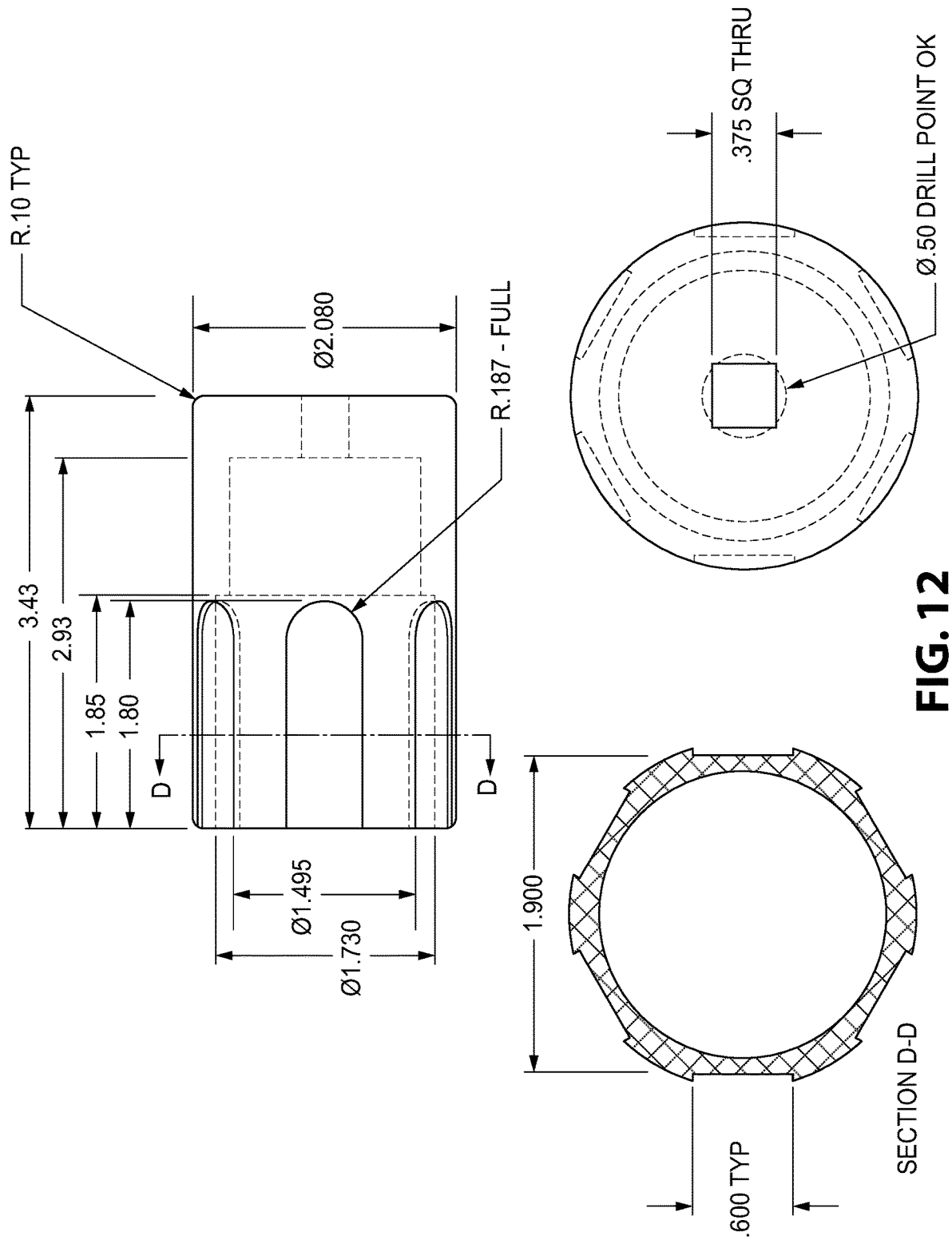
FIG. 12 depicts a manufacturing schematic with the dimensions for manufacture of a coupling member in accordance with a non-limiting embodiment of the present disclosure.

Referring now to FIG. 12, a manufacturing drawing of a non-limiting embodiment of the present disclosure is depicted, providing dimensions, tolerances, and material compositions that are all deemed within the scope of the present disclosure.

Figure 13:
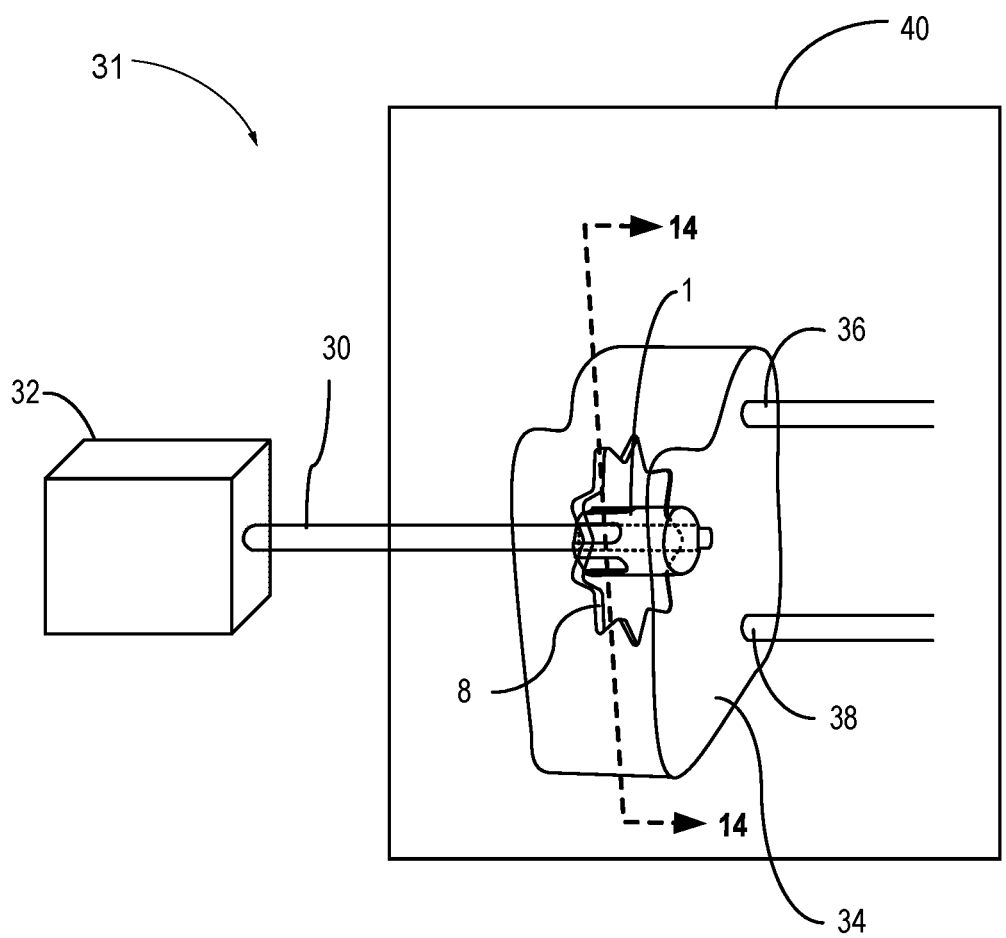
FIG. 13 depicts a side view of a priming pump according to one non-limiting embodiment of the present disclosure.
Figure 14:
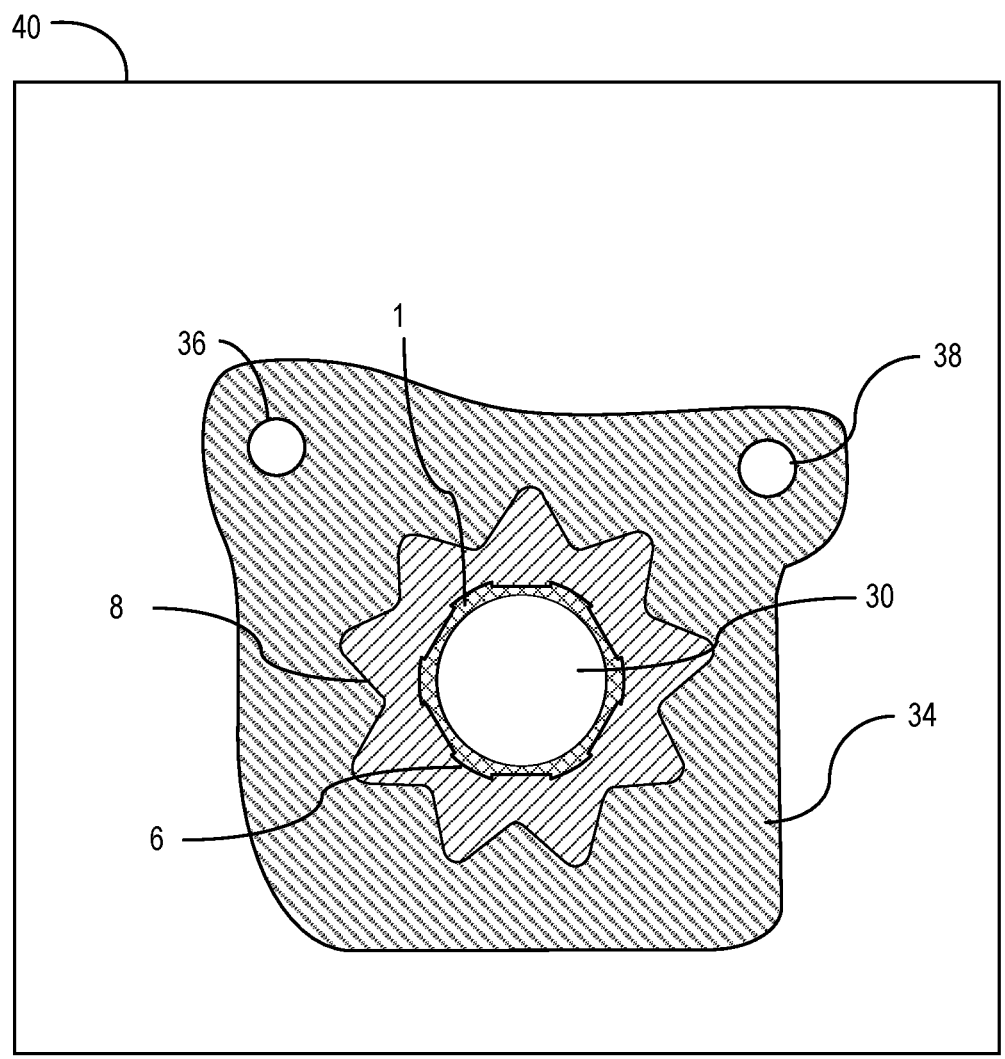
FIG. 14 depicts a front, cross-sectional view of the priming pump of FIG. 13 taken along line 14-14.

Referring now to FIGS. 13 and 14, a pump priming device 31 used in an internal combustion engine 40 is shown. The device 31 includes the coupling device 1 with the oil drive gear 8 mounted thereto, as discussed above. The coupling device 1 is connected to a drive shaft 30, which has a rotational force generated by the rotational drive 32. This rotational force is translated through the coupling device 1 and oil drive gear 8 and transmitted to the oil pump 34, having the suction side 36 and the pressure side 38.

Furthermore, while several embodiments of a coupling member are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A coupling member comprising:
   a first end;
   a second end; and
   a cylindrical length therebetween,
   wherein the first end of the coupling member is configured to axially engage a drive of a rotational drive, a plurality of fins extend along only a portion of the cylindrical length, the plurality of fins configured to engage an oil drive gear of an internal combustion engine, each fin from the plurality of fins protruding radially from an outer surface of the coupling member to translate a rotational force provided by the rotational drive to the oil drive gear of the internal combustion engine.

2. The coupling member of claim 1, wherein the first end comprises a port configured to receive the drive shaft, thereby axially engaging the coupling member and the drive shaft.

3. The coupling member of claim 2, wherein the port is configured to receive a ⅜ inch square drive.

4. The coupling member of claim 1, wherein each fin from the plurality of fins is arranged at a distance greater than or equal to 0.50 inches and less than or equal to 0.75 inches.

5. The coupling member of claim 1, wherein a first outer diameter of the coupling member is greater than or equal to 1.600 inches and less than or equal to 2.300 inches.

6. The coupling member of claim 1, wherein the plurality of fins is arranged to comprise a second outer diameter greater than or equal to 1.700 inches and less than or equal to 2.400 inches.

7. The coupling member of claim 1, wherein the internal combustion engine is a General Motors LS engine.

8. The coupling member of claim 1, wherein the internal combustion engine is a Chrysler Hemi engine.

9. The coupling member of claim 1, wherein the plurality of fins comprises six fins.

10. The coupling member of claim 1, wherein the plurality of fins comprises three fins.

11. The coupling member of claim 1, wherein an axial engagement between the first end of the coupling member and the drive shaft is permanent.

12. The coupling member of claim 1, wherein the rotational drive comprises a handheld electric drill, a hand driven ratchet, a pneumatically driven ratchet, or any combination thereof.

13. A pump priming device for an internal combustion engine with a fluid pump having at least one of a suction side and a pressure side, the pump priming device comprising:
    a coupling member comprising:
       a first end,
       a second end,
       a cylindrical length therebetween, and
       a plurality of fins extending along only a portion of the cylindrical length,
    wherein each fin from the plurality of fins protrudes radially from an outer surface of the coupling member;
    a rotational drive; and
    a drive shaft mounted to the rotational drive,
    wherein the coupling member, via the fins, and the drive shaft translates the rotational force provided by the rotational drive to an oil drive gear of the internal combustion engine, such that at least one of the suction side and pressure side of the fluid pump are primed.

14. The pump priming device of claim 13, wherein the rotational drive is a handheld electric drill.

15. The pump priming device of claim 13, wherein the drive shaft is a ⅜ inch square drive.

16. The pump priming device of claim 13, wherein the plurality of fins are configured to engage the oil drive gear of the internal combustion engine.

17. A method for priming a fluid pump of an internal combustion engine having at least one of a suction side and a pressure side, the method comprising:
    providing a coupling member, wherein the coupling member comprises:
       a first end,
       a second end,
       a cylindrical length therebetween, and
       a plurality of fins extending along only a portion of the cylindrical length, wherein each fin from the plurality of fins protrudes radially from an outer surface of the coupling member;
    inserting a fluid into the fluid pump of the internal combustion engine;
    engaging the coupling member, via the fins, and a drive shaft of a rotational drive such that a rotational force provided by the rotational drive is translated to the coupling member;
    aligning each fin from the plurality of fins with a corresponding geometrical portion of an oil drive gear of the internal combustion engine;
    inserting each fin from the plurality of fins into the corresponding geometrical portion of the oil drive gear such that each fin from the plurality of fins is capable of translating the rotational force applied to the coupling member to the oil drive gear;
    generating the rotational force using the rotational drive and translating the rotational force through the coupling member and into the oil drive gear of the internal combustion engine; and
    forcing the fluid inserted into the fluid pump into at least one of the suction side and the pressure side of the fluid pump.

* * * * *